US009838737B2

United States Patent
Eban et al.

(10) Patent No.: US 9,838,737 B2
(45) Date of Patent: Dec. 5, 2017

(54) FILTERING WIND NOISES IN VIDEO CONTENT

(71) Applicant: Google Inc., Mountain View, CA (US)

(72) Inventors: Elad Eban, Sunnyvale, CA (US); Aren Jansen, Los Altos, CA (US); Sourish Chaudhuri, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/147,040

(22) Filed: May 5, 2016

(65) Prior Publication Data
US 2017/0324990 A1  Nov. 9, 2017

(51) Int. Cl.
*H04N 5/60* (2006.01)
*H04N 21/439* (2011.01)

(52) U.S. Cl.
CPC ......... *H04N 21/4398* (2013.01); *H04N 5/602* (2013.01); *H04N 21/4394* (2013.01)

(58) Field of Classification Search
CPC . H04N 5/602; H04N 21/4398; H04N 21/4394
USPC ....... 348/738, 737, 736, 725, 719, 701, 606, 348/607, 622, 683, 512, 515, 516, 522, 348/533, 535, 423.1, 429.1, 462, 470, 348/471, 474, 480, 482, 484, 224.1, 239, 348/241, 193; 381/71.1, 71.14, 73.1, 92, 381/94.1, 94.5, 94.8, 317; 704/226, 233, 704/278
See application file for complete search history.

(56) References Cited

U.S. PATENT DOCUMENTS

| | | | | | |
|---|---|---|---|---|---|
| 5,982,901 | A * | 11/1999 | Kane | ................ | G11B 20/00992 348/614 |
| 8,223,990 | B1 * | 7/2012 | King | ...................... | H04B 15/00 381/92 |
| 2006/0122842 | A1 * | 6/2006 | Herberger | .............. | G10H 1/368 704/278 |
| 2006/0233391 | A1 * | 10/2006 | Park | ....................... | H04R 3/007 381/94.2 |
| 2007/0030989 | A1 * | 2/2007 | Kates | ................... | H04R 25/502 381/317 |
| 2008/0285774 | A1 * | 11/2008 | Kanamori | ................ | H04R 3/02 381/94.3 |
| 2008/0317261 | A1 * | 12/2008 | Yoshida | ................... | H04R 3/04 381/94.1 |

(Continued)

OTHER PUBLICATIONS

International Search Report and Written Opinion for the International Patent Application No. PCT/US2016/069206, dated Apr. 26, 2017, 24 pages.

*Primary Examiner* — Jefferey F Harold
*Assistant Examiner* — Mustafizur Rahman
(74) *Attorney, Agent, or Firm* — Lowenstein Sandler LLP

(57) ABSTRACT

Implementations disclose filtering wind noises in video content. A method includes receiving video content comprising an audio component and a video component, detecting, by a processing device, occurrence of a wind noise artifact in a segment of the audio component, identifying duration of the wind noise artifact and intensity of the wind noise artifact, selecting, by the processing device, a wind noise replacement operation based on the identified duration and intensity of the wind noise artifact, and applying, by the processing device, the selected wind noise replacement operation to the segment of the audio component to remove the wind noise artifact from the segment.

26 Claims, 5 Drawing Sheets

(56) References Cited

U.S. PATENT DOCUMENTS

| | | | | |
|---|---|---|---|---|
| 2008/0320545 A1* | 12/2008 | Schwartz | ........... | H04N 7/17318 |
| | | | | 725/135 |
| 2010/0020986 A1* | 1/2010 | Nemer | ..................... | H04R 3/00 |
| | | | | 381/94.1 |
| 2010/0053471 A1* | 3/2010 | Shikata | .................... | H04N 5/60 |
| | | | | 348/738 |
| 2010/0223054 A1* | 9/2010 | Nemer | ................... | H04R 3/007 |
| | | | | 704/219 |
| 2010/0278352 A1* | 11/2010 | Petit | ................... | G10L 21/0208 |
| | | | | 381/71.1 |
| 2011/0022992 A1* | 1/2011 | Zhou | ..................... | G06T 13/205 |
| | | | | 715/863 |
| 2011/0305351 A1 | 12/2011 | Kimura | | |
| 2012/0039478 A1* | 2/2012 | Yoshioka | ................ | G10L 25/90 |
| | | | | 381/56 |
| 2012/0191447 A1* | 7/2012 | Joshi | ................... | G10L 21/0208 |
| | | | | 704/226 |
| 2012/0288116 A1* | 11/2012 | Saito | ........................ | H04R 3/00 |
| | | | | 381/94.2 |
| 2013/0208895 A1* | 8/2013 | Horbach | ................. | H04S 5/005 |
| | | | | 381/17 |
| 2013/0222127 A1* | 8/2013 | Ray Avalani | .......... | B60Q 9/008 |
| | | | | 340/436 |
| 2014/0347565 A1* | 11/2014 | Fullam | ................... | H04N 5/607 |
| | | | | 348/738 |
| 2015/0332729 A1* | 11/2015 | Schmouker | .......... | G11B 27/022 |
| | | | | 386/282 |
| 2015/0348546 A1* | 12/2015 | Sun | ........................ | G10L 21/02 |
| | | | | 704/233 |
| 2016/0080864 A1* | 3/2016 | Scarlett | .................. | H04R 3/005 |
| | | | | 381/94.1 |

* cited by examiner

FILTERING WIND NOISES IN VIDEO CONTENT

TECHNICAL FIELD

This disclosure relates to the field of content sharing platforms and, in particular, to filtering wind noises in video content.

BACKGROUND

Many content-sharing websites allow users to post images and videos for public and private display. Recent technological advancements also have made it increasingly convenient for users to capture and share their own visual content. For example, smartphones having one or more high-quality digital cameras, abundant storage space, and mobile broadband allow users to record and share their own videos from virtually anywhere. However, videos recorded outdoors are susceptible to distortions created by the environment. A common culprit is wind noise, which leads to unpleasant clipping of the audio signal for a substantially degraded user experience.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method receiving video content comprising an audio component and a video component, detecting, by a processing device, occurrence of a wind noise artifact in a segment of the audio component, identifying duration of the wind noise artifact and intensity of the wind noise artifact, selecting, by the processing device, a wind noise replacement operation based on the identified duration and intensity of the wind noise artifact, and applying, by the processing device, the selected wind noise replacement operation to the segment of the audio component to remove the wind noise artifact from the segment.

In one implementation, the wind noise replacement operation includes in-filling the segment with an interpolation of audio signal extracted from other segments of the audio component surrounding the segment. In addition, the wind noise replacement operation may include filtering the segment to remove the wind noise artifact from the segment. The wind noise replacement operation may also include replacing the segment with silence. The wind noise replacement operation may also include replacing the wind noise artifact with audio signal extracted from another segment of the audio component. Furthermore, the wind noise replacement operation may include replacing the audio component with a different audio component.

In another implementation, a user is prompted to select the different audio component. In addition, selecting the wind noise replacement operation in the method may further include deriving a plurality of signals from the identified duration and the identified intensity of the wind noise artifact, mapping the derived signals to a corresponding set of threshold values, and selecting the wind noise replacement operation that corresponds to the set of thresholds values mapped to the derived signals.

Furthermore, the derived signals may include one or more frequencies of the wind noise artifact and a signal-to-noise ratio corresponding to the wind noise artifact. In addition, identifying the duration of the wind noise artifact in the method may further include identifying a percentage of the audio component affected by the wind noise artifact. In one implementation, machine learning is used to detect the occurrence of the wind noise artifact. In another implementation, deep learning is used to detect the occurrence of the wind noise artifact. Furthermore, spectrogram analysis may be used to detect the occurrence of the wind noise artifact.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Aspects and implementations of the disclosure are directed to filtering wind noises in video content. In one implementation, a wind noise adjustment system provides automated wind noise detection and correction/replacement of wind noise in user videos of a content sharing platform. When a user records and/or uploads a video to the content sharing platform, the wind noise adjustment system automatically analyzes an audio component of the video content to identify any occurrences of wind noise (i.e., wind noise artifacts). For any detected wind noise, data identifying the audio segment in which the wind noise occurs, the intensity and duration of the wind noise, and the surrounding context audio (i.e., a predetermined time interval of other segments prior to and/or subsequent to an identified audio segment including the detected wind noise) of the audio segment with the identified wind noise are used to determine a type of wind noise replacement operation to apply to the audio segment with identified wind noise. The wind noise replacement operation may include in-filling the wind noise audio segment with an interpolation of the surrounding audio signal or spectrogram, filtering the wind noise from the audio segment, replacing the audio segment with an estimate of non-clipped background noise from the video or silence, or replacing the entire audio file of the video with background music or another audio track (after prompting the user).

Existing solutions for wind noise reduction do not provide for the use of varied approaches to wind noise replacement based on the characteristics of the wind noise. Prior solutions for wind noise reduction relied on several microphones simultaneously recording the audio signal and used these multiple recordings to reduce unwarranted background noise. Another approach modeled the environment as a competing source and used a source separation technique to filter wind noise. However, wind noise can lead to clipping (i.e., sending the signal to maximum amplitude), which is a destructive transformation that precludes the application of these existing solutions. Implementations of the disclosure provide for the use of a variety of wind noise replacement operations based on characteristics of the detected wind noise, where the detection and replacement of the wind noise (including clipping) are performed automatically and upon generation and/or upload of the video to the content sharing platform. As such, implementations automatically remove the wind noise artifacts from videos recorded on mobile devices and/or uploaded to the content sharing platform and thus improve the overall user experience on the content sharing platform.

The disclosure often references videos for simplicity and brevity. However, the teaching of the present disclosure are applied to media items generally and can be applied to various types of content or media items, including for example, video, audio, text, images, program instructions, etc.

Figure 1:
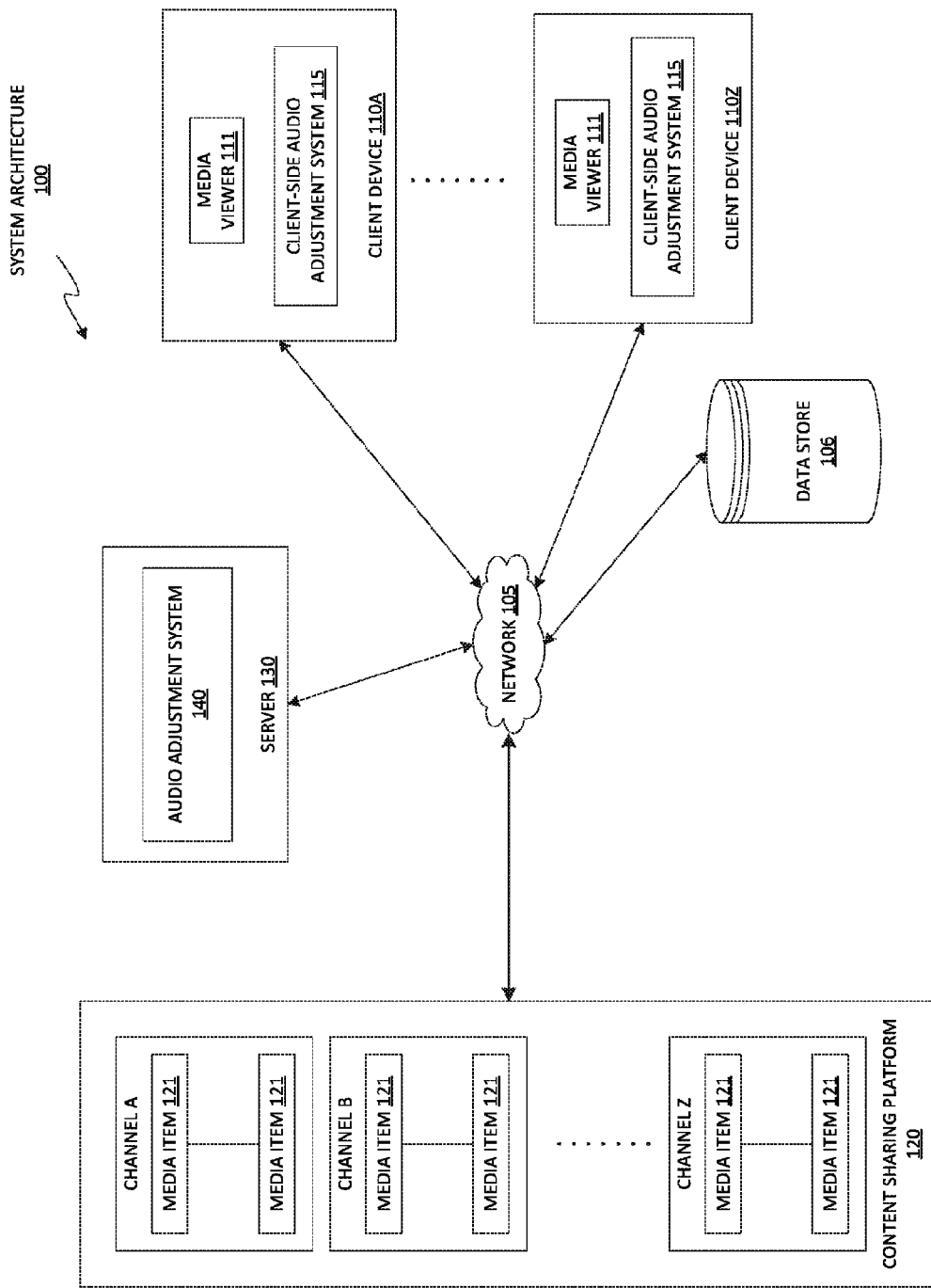
FIG. 1 is a block diagram illustrating an exemplary network architecture in which implementations of the present disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for users to record, edit, and/or upload content for sharing on the content sharing platform, and implements filtering wind noises in video content.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include an audio adjustment system 140. The audio adjustment system 140 enables the filtering of wind noises in user content in implementations of the disclosure. In some implementations, client device 110A-110Z may include a client-side audio adjustment system 115 that enables the filtering of wind noises in user content. Client-side audio adjustment system 115 may perform implementations of the disclosure independently of audio adjustment system 140 of server 130, or may work in conjunction with audio adjustment system 140. Although the following description may refer audio adjustment system 140 performing implementations of the disclosure, it should be understood that functionality of audio adjustment system 140 may be similarly performed solely by, and/or in conjunction with, client-side audio adjustment system 115 at client device 110A-110Z.

In one implementation, user content may include a video. A video is a set of sequential image frames representing a scene in motion. For example, a series of sequential images may be captured continuously or later reconstructed to produce animation. Video content may be presented in various formats including, but not limited to, analog, digital, two-dimensional and three-dimensional video. Further, video content may include movies, video clips or any set of animated images to be displayed in sequence. In addition, video content may be stored in a video file that includes a video component and an audio component. The video component may refer to video data in a video coding format (e.g., H.264, H.264 MPEG-4 Part 2, etc.). The audio component may refer to audio data in an audio coding format (e.g., advanced audio coding (AAC), MP3, etc.).

Users of the content sharing platform 120 may include amateurs who may record videos on their devices (e.g., camera phones) 110A-Z outdoors without considering weather conditions. For example, videos recorded in inclement weather, on beaches, during adventure sports such as skiing, etc. are often susceptible to noise caused by wind conditions. Audio adjustment system 140 may analyze video content to provide automated wind noise detection and correction for the video content. The audio adjustment system 140 may analyze an audio component (also referred to as an audio file, audio stream, audio signal, aural information, etc.) of video content to detect occurrence of a wind noise artifact in the audio component. A wind noise artifact may refer to an error or anomaly in the perception or representation of aural information (e.g., audio component) introduced by the occurrence of wind during the capture of the aural information (e.g., recording of a video including the audio component). Depending upon the characteristics of the detected wind noise artifacts, the audio adjustment system 140 selects a wind noise replacement operation to utilize to correct and/or replace the detected wind noise artifact in the audio component.

In one implementation, the wind noise replacement operation utilized by the audio adjustment system 140 may vary depending on a direction and intensity of the detected wind noise artifact. In one implementation, wind noise replacement operations may include, but are not limited to, in-filling the wind noise artifact with an interpolation of audio signals extracted from surrounding segments of the audio component, replacing the wind noise artifact with silence, replacing the wind noise artifact with an audio segment extracted from surrounding segments of the audio component, or replacing the entire audio component with a different audio component.

In some implementations, audio adjustment system 140 of server 130 may interact with content sharing platform 120 to provide implementations of the disclosure. Further description of the audio adjustment system 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
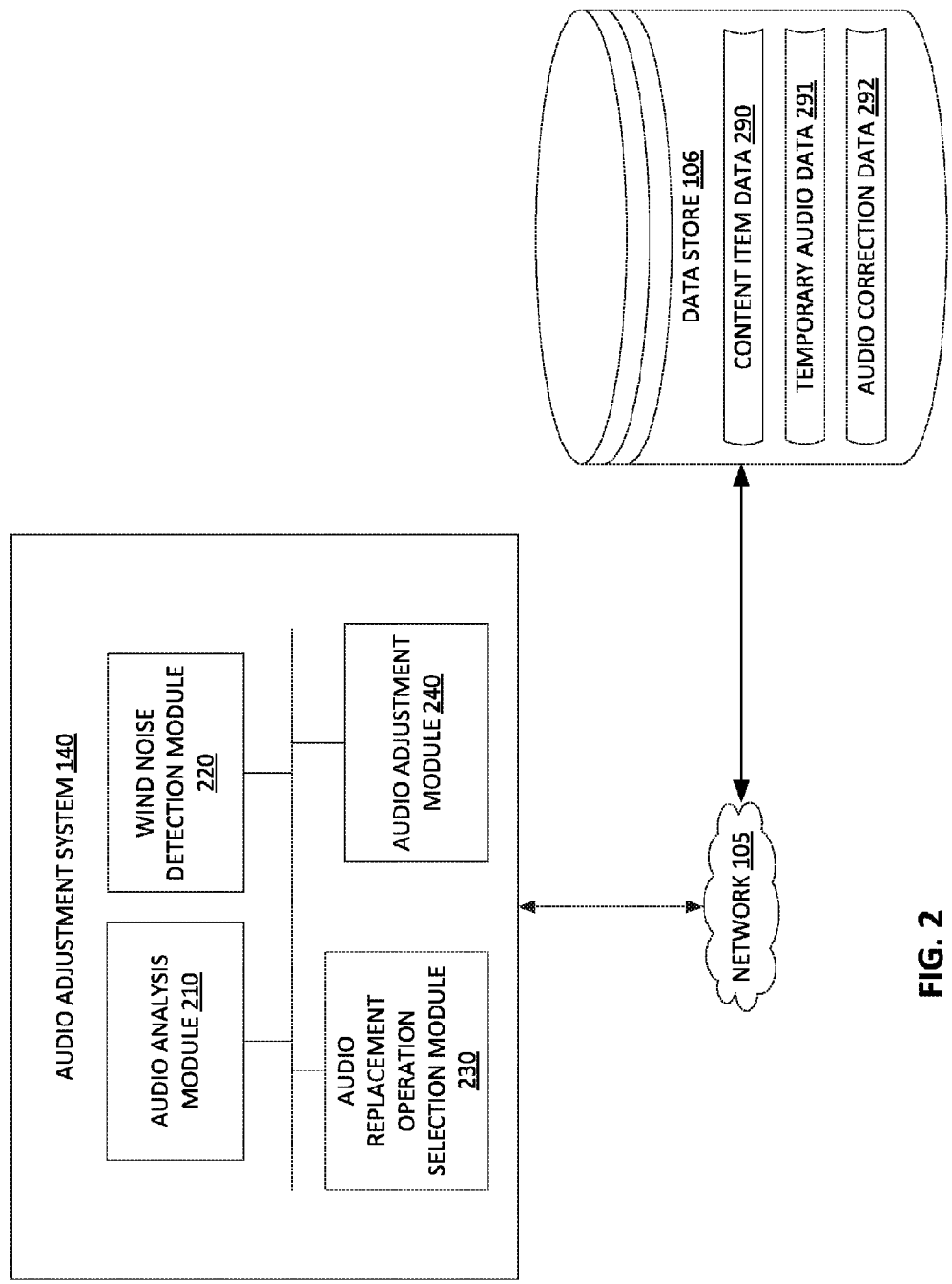
FIG. 2 is a block diagram of an audio adjustment system, in accordance with an implementation of the disclosure.

FIG. 2 is a block diagram illustrating audio adjustment system 140 in accordance with one implementation of the disclosure. As discussed above, the audio adjustment system 140 may interact with a single social network, or may be utilized among multiple social networks (e.g., provided as a service of a content sharing platform that is utilized by other third party social networks). In one implementation, the audio adjustment system 140 includes an audio analysis module 210, a wind noise detection module 220, an audio replacement operation selection module 230, and an audio adjustment module 240. More or less components may be included in the audio adjustment system 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The audio adjustment system 140 is communicatively coupled to the data store 106. For example, the audio adjustment system 140 may be coupled to the data store 106 via a network (e.g., via network 105 as illustrated in FIG. 1). In another example, the audio adjustment system 140 may be coupled directly to a server where the audio adjustment system 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, temporary audio data 291, and audio correction data 292.

As discussed above, the audio adjustment system 140 enables the filtering of wind noises in user content in implementations of the disclosure. In one implementation, user content may include a video that is referred to herein as video content. Video content may be stored as content item data 290 in data store 106. The audio analysis module 210 of audio adjustment system 140 may include logic to analyze the video content in order to identify an audio component and a video component. The audio component may be audio data of the video content that is represented in an audio coding format.

The identified audio component may then be provided to the wind noise detection module 220. The wind noise detection module 220 includes logic to detect occurrence of a wind noise artifact in the audio component. As discussed above, a wind noise artifact may refer to an error or anomaly in the perception or representation of the audio component that is introduced by the occurrence of wind during the capture of the audio information represented by the audio component. A variety of operations may be implemented by the wind noise detection module 220 to detect occurrences of wind noise (e.g., searching for the aberrant discontinuities) in an audio component.

In one implementation, the wind noise detection module 220 may generate a spectrogram of the audio component. The spectrogram is a visual representation of the frequencies occurring in the audio component as they vary with time or some other variable. The spectrogram of the audio component may be analyzed and processed to identify whether the audio component includes any frequencies that are representative of a wind noise artifact. For example, wind noise has a large amount of low frequency content, and typically occurs in the low frequency regions of a spectrogram.

In another implementation, wind noise detection module 220 may implement machine-learning techniques to identify wind noise artifacts in the audio component. Machine learning is a method of data analysis that automates analytical model building. Using algorithms that iteratively learn from data, machine learning allows computing devices to find hidden insights without being explicitly programmed where to look. For example, a training set of videos and a classification of each video in the training set with respect to the presence of wind noise artifacts can be provided to a classifier, which derives a correspondence between characteristics of the videos (or their audio components) and the classifications provided for these videos. Once the classifier is trained using the training set of videos, the classifier can process new videos, determine whether they include wind noise artifacts, and identify video segments that include such artifacts.

In one implementation, a branch of machine learning referred to as deep learning may be utilized to identify wind noise artifacts in the audio component. Deep learning (also referred to as deep structured learning, hierarchical learning or deep machine learning) is based on a set of algorithms that attempt to model high-level abstractions in data by using multiple processing layers, with complex structures or otherwise, composed of multiple non-linear transformations. Deep learning may also be described as part of a broader family of machine learning techniques based on learning representations of data. Deep learning may be utilized to develop various audio event detection approaches that can describe classes of audio event (e.g., wind noise) that occur in a given audio component. The wind noise detection module 220 may then implement the developed audio event detection approaches to identify occurrences of wind noise artifacts in an audio component.

Using one or more of the above-described techniques, the wind noise detection module 220 identifies a segment (e.g., a portion, clip, and/or subset) of the audio component where a wind noise artifact was detected. In some implementations, more than one segment may be identified by the wind noise detection module 220. The wind noise detection module 220 may also provide characteristics corresponding to the identified segment. The characteristics of the segment may include, but are not limited to, the beginning and ending time markers that define the segment within the audio component, time length of the segment, frequencies occurring in the segment, and/or amplitude of the segment. In one implementation, characteristics of the audio segment may be stored in temporary audio data 291 of data store 106.

The audio replacement operation selection module 230 may receive the characteristics identified for each segment in which the wind noise detection module 220 detected occurrence of a wind noise artifact. In some implementations, the identified segment itself may be provided by the wind noise detection module 220 in addition to the characteristics identified for the segment. In other implementations, the identified segment is provided by the wind noise detection module 220 without any associated characteristics. The wind noise detection module 220 may also provide data corresponding to a surrounding audio context for the segment (i.e., a predetermined time interval of other segments prior to and/or subsequent to the identified audio segment). In a further implementation, the wind noise detection module 220 may also provide a segment of the video component corresponding to the identified audio component.

In one implementation, depending upon the characteristics of the detected wind noise artifacts, the audio replacement operation selection module 230 selects a wind noise replacement operation to be used to correct and/or replace the detected wind noise artifact in the segment of the audio component. In one implementation, wind noise replacement operations may include, but are not limited to, in-filling the wind noise artifact with an interpolation of an audio signal extracted from surrounding segments of the audio component, filtering/cleaning the audio segment to remove the wind noise artifact, replace the audio segment with an estimate of non-clipped background noise from the video, replacing the wind noise artifact with silence, and replacing the audio component with a different audio component.

In one implementation, the wind noise replacement operation selected by the audio replacement operation selection module 230 may vary depending on the identified characteristics of the segment. The audio replacement operation selection module 230 may maintain threshold values corresponding to signals derived from the characteristics of the audio component segment provided by the wind noise detection module 220. The threshold values are used to determine the wind noise replacement operation that is applied.

For example, the signals may correspond to the duration and intensity of the wind noise artifact, as measured by, for example, one or more frequencies of the wind noise artifact and a signal-to-noise ratio corresponding to the wind noise artifact. These signals, when taken together, can provide an estimate of how destructive the detected wind noise is to the audio component segment as well as to the overall audio component (e.g., percentage of video affected). The threshold values may be established by the audio replacement operation selection module 230 based on user satisfaction studies (e.g., determining which threshold values resulted in highest user satisfaction).

In one implementation, when the derived signals from the identified audio segment satisfy a first predetermined set of threshold values, the audio replacement operation of in-filling the wind noise artifact may be selected by the audio replacement operation selection module 230. In-filling the wind noise artifact includes replacing the wind noise artifact with an estimate of the non-clipped background audio in the segment and/or audio component. Replacing the wind noise artifact can include replicating audio texture occurring outside of a destroyed section of audio (e.g., using the surrounding audio context) within the destroyed section of audio. Audio texture may be replicated by determining an interpolation of an audio signal and/or spectrogram extracted from the surrounding audio context (e.g., other segments) of the audio component. In this case, the surrounding audio context from the other segments may be utilized for the identified audio segment. In some implementations, in-filling the wind noise artifact may be selected as an audio replacement operation when the length of the frequency domain (of the wind noise artifact) in the identified audio segment is short and/or there are few to no spoken words within the frequency domain in the identified audio segment.

In another implementation, when the derived signals from the identified audio segment satisfy a second predetermined set of threshold values, the audio replacement operation of filtering and/or cleaning the audio signal may be selected by the audio replacement operation selection module 230. The operation of filtering the audio signal aims to recover an underlying audio signal within the segment. A variety of filtering techniques may be employed, including, but not limited to, dynamic noise limiter (DNL), dynamic noise reduction (DNR), time-frequency filters, other special-purpose noise reduction programs, and so on. In some implementations, filtering and/or cleaning the audio signal may be selected as an audio replacement operation when the width and intensity of the frequency domain of the identified audio segment are not high (e.g., indicative of extreme and/or destructive wind noise in the audio segment).

In a further implementation, when the derived signals from the identified audio segment satisfy a third predetermined set of threshold values, the audio replacement operation of replacing the wind noise artifact with silence may be selected by the audio replacement operation selection module 230. The operation of replacing with silence may include adjusting the amplitude of the audio segment to zero. Replacing the wind noise artifact in the audio segment with silence may be selected as an audio replacement operation when the length, width, and intensity of the frequency domain indicate that the wind noise artifact is destructive and extended over a long time interval. In other implementations, replacing the wind noise artifact in the audio segment with silence may be selected as an audio replacement operation when the length of the frequency domain is short, but the width and intensity indicate destruction of the audio component in the segment. In addition, replacement of the wind noise artifact with silence may be selected as the audio replacement operation when the wind noise artifact is destructive and in-filling is not a viable replacement option (e.g., spoken words are in the surrounding audio context).

In one implementation, when the derived signals from the identified audio segment satisfy a fourth predetermined set of threshold values, the audio replacement operation of replacing the wind noise artifact with an estimate of non-clipped background noise from the video may be selected by the audio replacement operation selection module 230. The operation of replacing with an estimate of non-clipped background noise from the video may include utilizing surrounding audio segments (e.g., near in time proximity to the identified audio segment) as the non-clipped background noise to replace the wind noise artifact. Replacing the wind noise artifact in the audio segment with an estimate of non-clipped background noise may be selected as the audio replacement operation when the length of the frequency domain is short, but the width and intensity indicate destruction of the audio component in the segment.

In another implementation, when the derived signals from the identified audio segment satisfy a fifth predetermined set of threshold values, the audio replacement operation of replacing the wind noise artifact with a different audio component may be selected by the audio replacement operation selection module 230. The operation of replacing with a different audio component may include replacing the entire audio component with a background music track. In one implementation, the user may be prompted for a selection of his or her preferred audio component to use as the replacement. Replacing the wind noise artifact in the audio segment with a different audio component may be selected as an audio replacement operation when the length, width, and intensity of the frequency domain indicate that the wind noise artifact is destructive and extended over a long time interval (e.g., no good segment of audio component left that can be used for in-fill/interpolation).

Once the appropriate wind noise replacement operation is selected, the audio adjustment module 240 applies the wind noise replacement operation to the audio segment to remove the wind noise artifact from the audio segment. In one implementation, the original audio segment and the corrected audio segment may be stored in audio correction data 292 of data store 106. The audio adjustment module 240 may then provide the updated audio component to be stored as part of the video in content item data 290 of data store 106.

Figure 3:
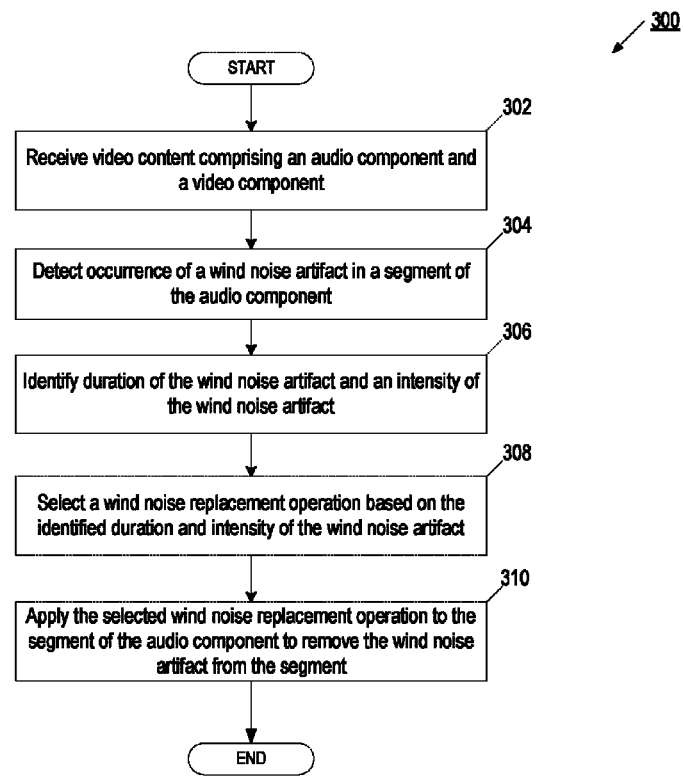
FIG. 3 is a flow diagram illustrating a method for filtering wind noises in video content according to an implementation.

FIG. 3 is a flow diagram illustrating a method 300 for filtering wind noise in video content according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by audio adjustment module 140 as shown in FIG. 2.

Method 300 begins at block 302 where video content is received that includes an audio component and a video component. Then, at block 304, occurrence of a wind noise artifact is detected in a segment of the audio component. In one implementation, as discussed above, the wind noise artifact may be detected via spectrogram analysis, machine learning, or deep learning, to name a few examples. Then, at block 306, a duration and an intensity of the wind noise artifact may be identified.

Subsequently, at block 308, a wind noise replacement operation is selected based on the identified duration and intensity of the wind noise artifact. In one implementation, one or more signals corresponding to the audio segment may be derived from the duration and intensity of the wind noise artifact. The signals may include a length of a frequency domain of the wind noise artifact, a width of the frequency domain, and an intensity of the frequency domain. These signals may then be mapped to threshold values for each signal to determine a wind noise replacement operation corresponding to the mapped threshold values. The wind noise operations may include, but are not limited to, in-filling the wind noise artifact with an interpolation of an audio signal extracted from surrounding segments of the audio component, filtering/cleaning the audio segment to remove the wind noise artifact, replacing the wind noise artifact with silence, replacing the wind noise artifact with an estimate of non-clipped background noise from the video, and replacing the audio component with a different audio component.

Lastly, at block 310, the selected wind noise replacement operation is applied to the segment of the audio component. The selected wind noise replacement operation is used to remove the wind noise artifacts from the audio segment of the audio component.

Figure 4:
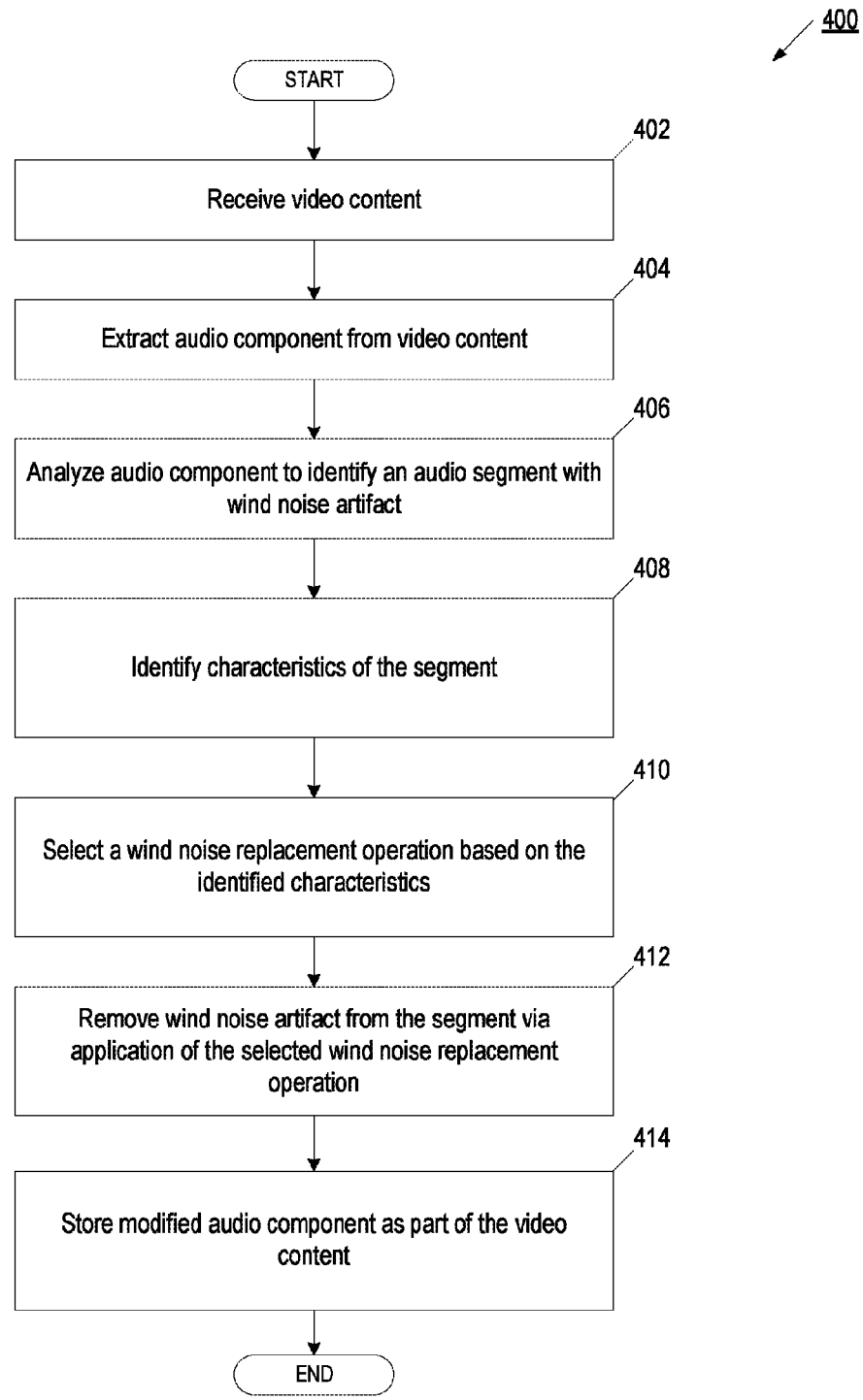
FIG. 4 is a flow diagram illustrating another method for filtering wind noises in video content, according to an implementation.

FIG. 4 is a flow diagram illustrating another method 400 for filtering wind noises in video content according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by audio adjustment module 140 as shown in FIG. 2.

Method 400 begins at block 402 where video content is received. Then, at block 404, an audio component is extracted from the video content. At block 406, the audio component is analyzed in order to identify an audio segment having a wind noise artifact. In one implementation, the wind noise artifact may be detected via spectrogram analysis, machine learning, or deep learning, to name a few examples. Then, at block 408, characteristics of the audio segment are determined. In one implementation, the characteristics may include a duration and an intensity of the wind noise artifact in the audio segment.

Subsequently, at block 410, a wind noise replacement operation is selected based on the identified characteristics. In one implementation, one or more signals corresponding to the audio segment may be derived from the characteristics of the wind noise artifact. The signals may include the duration and intensity of the wind noise artifact, as measured by, for example, one or more frequencies of the wind noise artifact and a signal-to-noise ratio corresponding to the wind noise artifact. These signals may then be mapped to threshold values for each signal to determine a wind noise replacement operation corresponding to the mapped threshold values. The wind noise operations may include, but are not limited to, in-filling the wind noise artifact with an interpolation of an audio signal extracted from surrounding segments of the audio component, filtering/cleaning the audio segment to remove the wind noise artifact, replacing the wind noise artifact with silence, replacing the wind noise artifact with an estimate of non-clipped background noise from the video, and replacing the audio component with a different audio component.

At block 412, the selected wind noise replacement operation is applied to the segment of the audio component. The selected wind noise replacement operation is used to remove the wind noise artifact from the audio segment. Lastly, at block 414, the modified audio component is stored as part of the video content.

Figure 5:
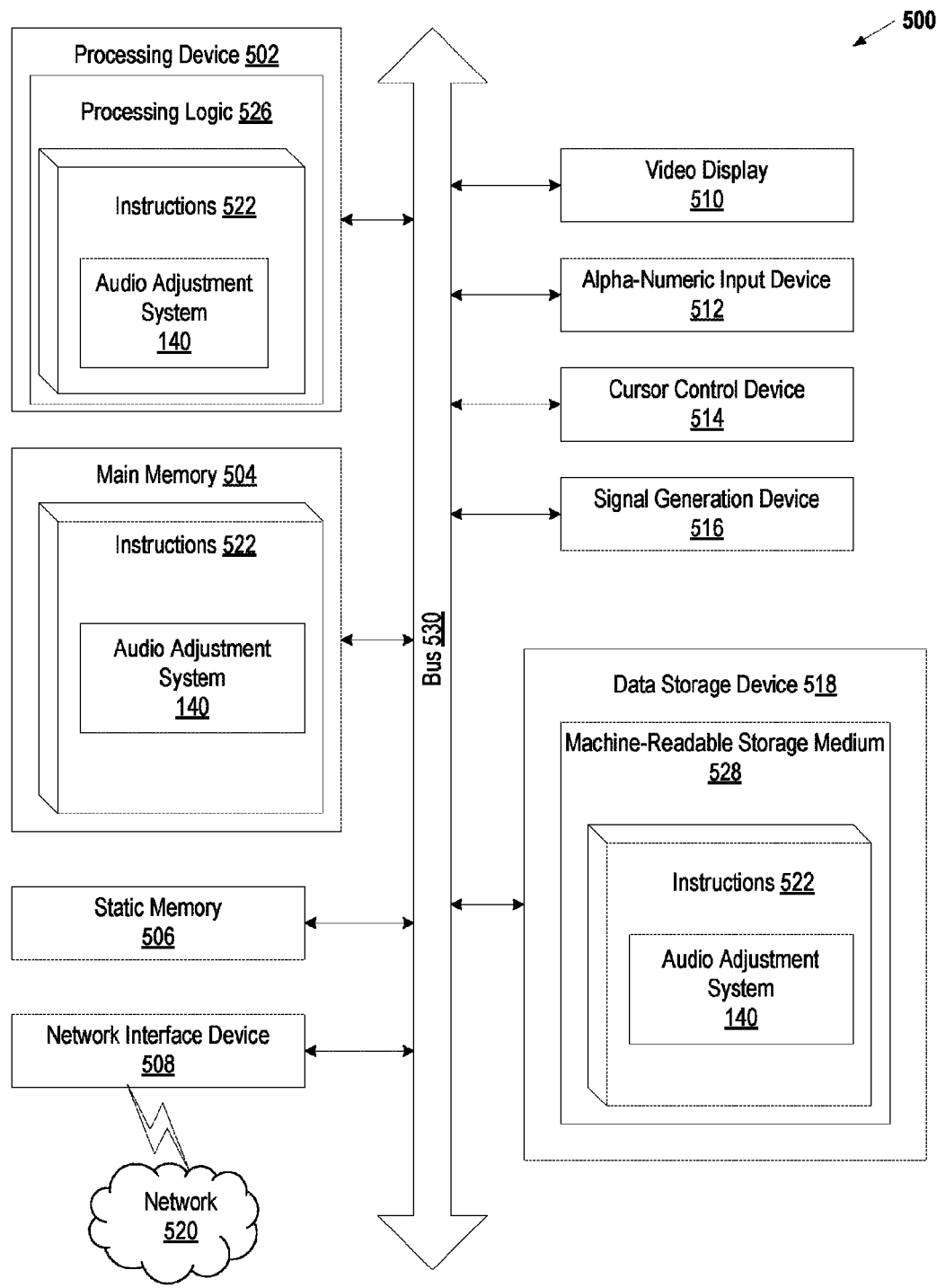
FIG. 5 is a block diagram illustrating one implementation of a computer system, according to an implementation.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 500 may be representative of a server, such as server 102, executing an audio adjustment system 140, as described with respect to FIGS. 1 and 2.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 (also referred to as a machine-readable storage medium), on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-readable storage media. The instructions 722 may further be transmitted or received over a network 520 via the network interface device 508.

The computer-readable storage medium 528 may also be used to store instructions to perform a method for filtering wind noises in video content, as described herein. While the computer-readable storage medium 528 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   receiving video content comprising an audio component and a video component;
   detecting, by a processing device, occurrence of a wind noise artifact in a segment of the audio component;
   identifying duration of the wind noise artifact and intensity of the wind noise artifact, wherein the duration comprises a time length of the wind noise artifact in the segment and wherein the intensity is based on frequency values of the wind noise artifact;
   selecting, by the processing device, a wind noise replacement operation based on the identified duration and intensity of the wind noise artifact; and
   applying, by the processing device, the selected wind noise replacement operation to the segment of the audio component to remove the wind noise artifact from the segment.

2. The method of claim 1, wherein the wind noise replacement operation comprises in-filling the segment with an interpolation of audio signal extracted from other segments of the audio component surrounding the segment.

3. The method of claim 1, wherein the wind noise replacement operation comprises filtering the segment to remove the wind noise artifact from the segment.

4. The method of claim 1, wherein the wind noise replacement operation comprises replacing the segment with silence.

5. The method of claim 1, wherein the wind noise replacement operation comprises replacing the wind noise artifact with audio signal extracted from another segment of the audio component.

6. The method of claim 1, wherein the wind noise replacement operation comprises replacing the audio component with a different audio component.

7. The method of claim 6, wherein a user is prompted to select the different audio component.

8. The method of claim 1, wherein selecting the wind noise replacement operation further comprises:
deriving a plurality of signals from the identified duration and the identified intensity of the wind noise artifact;
mapping the derived signals to a corresponding set of threshold values; and
selecting the wind noise replacement operation that corresponds to the set of thresholds values mapped to the derived signals.

9. The method of claim 8, wherein the derived signals comprise one or more frequencies of the wind noise artifact and a signal-to-noise ratio corresponding to the wind noise artifact.

10. The method of claim 1, wherein machine learning is used to detect the occurrence of the wind noise artifact.

11. The method of claim 1, wherein deep learning is used to detect the occurrence of the wind noise artifact.

12. The method of claim 1, wherein spectrogram analysis is used to detect the occurrence of the wind noise artifact.

13. A system comprising:
a memory; and
a processing device coupled to the memory, wherein the processing device is to:
extract an audio component from video content;
analyze the audio component to identify occurrence of a wind noise artifact in a segment of the audio component;
identify characteristics of the segment, wherein the characteristics comprise a duration and an intensity of the wind noise artifact in the segment, the duration comprising a time length of the wind noise artifact in the segment and the intensity is based on frequency values of the wind noise artifact;
select a wind noise replacement operation based on the identified characteristics; and
remove the wind noise artifact from the segment via application of the selected wind noise replacement operation to the segment.

14. The system of claim 13, wherein the wind noise replacement operation comprises in-filling the segment with an interpolation of audio signal extracted from other segments of the audio component surrounding the segment.

15. The system of claim 13, wherein the wind noise replacement operation comprises filtering the segment to remove the wind noise artifact from the segment.

16. The system of claim 13, wherein the wind noise replacement operation comprises replacing the wind noise artifact with audio signal extracted from another segment of the audio component.

17. The system of claim 13, wherein the wind noise replacement operation comprises replacing the segment with silence.

18. The system of claim 13, wherein the wind noise replacement operation comprises replacing the audio component with a different audio component.

19. The system of claim 13, wherein the characteristics of the segment further comprise at least one of time markers of the segment or an amplitude of the segment.

20. The system of claim 13, wherein the processing device to select the wind noise replacement operation further comprises:
deriving a plurality of signals from the identified characteristics;
mapping the derived signals to corresponding set of threshold values; and
selecting the wind noise replacement operation that corresponds to the set of thresholds values mapped to the derived signals.

21. A non-transitory machine-readable storage medium storing instructions which, when executed, cause a processing device to perform operations comprising:
extracting an audio component from video content;
detecting, by the processing device, occurrence of a wind noise artifact in a segment of the audio component;
identifying, by the processing device, characteristics of the wind noise artifact, wherein the characteristics comprise a duration and an intensity of the wind noise artifact in the segment, the duration comprising a time length of the wind noise artifact in the segment and the intensity is based on frequency values of the wind noise artifact;
selecting, by the processing device, a wind noise replacement operation based on the identified characteristics of the wind noise artifact;
applying the selected wind noise replacement operation to the segment of the audio component to remove the wind noise artifact from the segment and generate a modified audio component;
combining the modified audio component with the video content; and
transmitting, by the processing device, the video content to a content sharing platform.

22. The non-transitory machine-readable storage medium of claim 21, wherein the wind noise replacement operation comprises in-filling the segment with an interpolation of audio signal extracted from other segments of the audio component surrounding the segment.

23. The non-transitory machine-readable storage medium of claim 21, wherein the wind noise replacement operation comprises filtering the segment to remove the wind noise artifact from the segment.

24. The non-transitory machine-readable storage medium of claim 21, wherein the wind noise replacement operation comprises replacing the segment with silence.

25. The non-transitory machine-readable storage medium of claim 21, wherein the wind noise replacement operation comprises replacing the wind noise artifact with audio signal extracted from another segment of the audio component.

26. The non-transitory machine-readable storage medium of claim 21, wherein the wind noise replacement operation comprises replacing the audio component with a different audio component.

* * * * *